United States Patent Office 2,744,508
Patented May 8, 1956

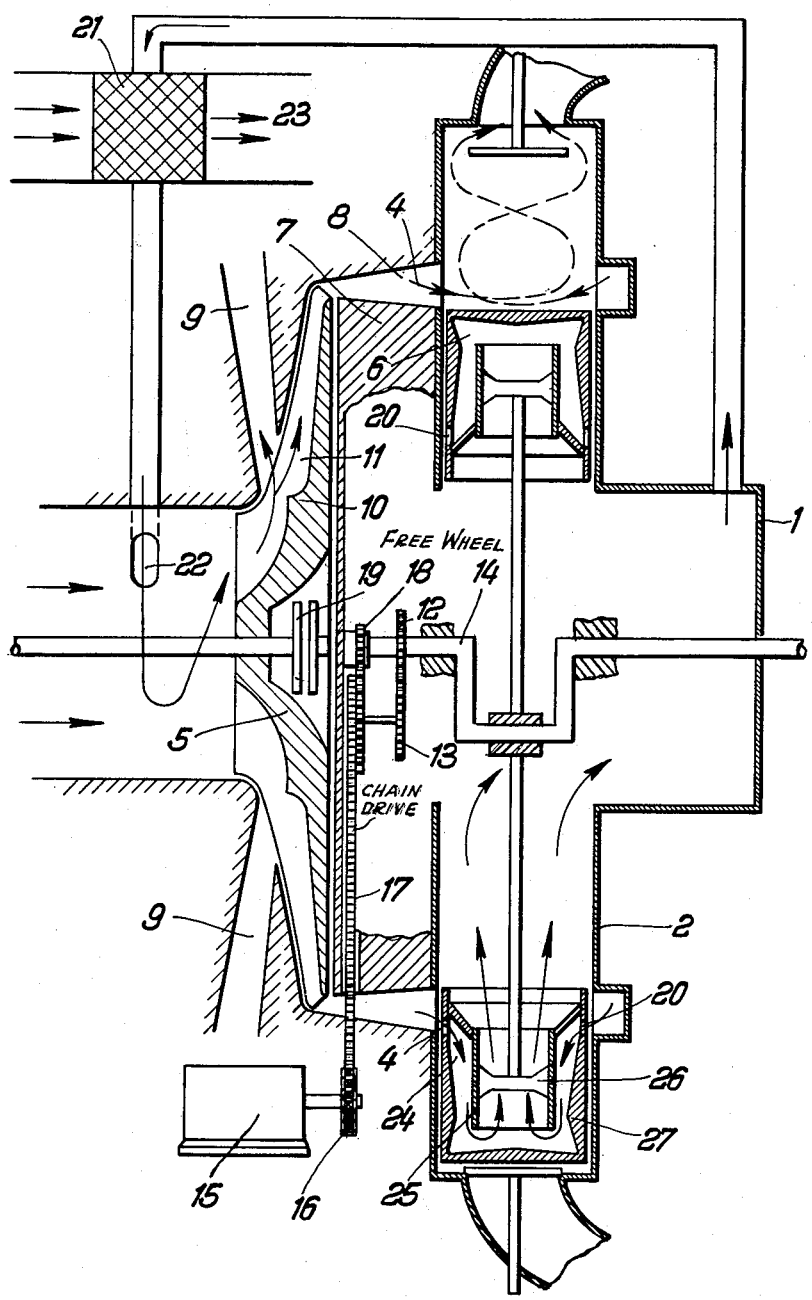

2,744,508
INTERNAL COMBUSTION ENGINES

Ludwig Elsbett, Salzgitter-Bad, Germany, assignor to Wolfgang Henry Richard Behrens, Cologny-Genf, Switzerland Application April 17, 1953, Serial No. 349,379

6 Claims. (Cl. 123—41.39)

The present invention relates to internal combustion engines, for example of the two-stroke supercharged type. Engines of this type are provided either with liquid or with external air cooling means. In both cases the major part of the waste heat produced by the power developed in the combustion chamber is conducted through the walls of the cylinder and of the piston and is removed by air-cooling or by a liquid circulating in a cylinder jacket. For this purpose, the cross-section of the heat conducting means and the surface area of the cooling elements must be suitably large. Furthermore, a special outer circulatory system must be provided for an engine with liquid or air cooling means.

According to the invention, however, the waste heat of combustion is withdrawn directly from the interior of the cylinder by a cooling medium. The working surface of the hot piston crown and the interior of the piston may also be cooled similarly. Air is preferably used as a scavenging agent; this air can, according to a further modification of the invention, be supplied by the scavenging blower of the engine.

In the construction of this type of engine there are several possible methods of supplying the cooling air to the interior of the cylinder. The air may for example be admitted through additional cooling apertures before the working stroke begins. Preferably, however, the same openings are employed for admitting and expelling the cooling air through which the scavenging air is also admitted and expelled. The scavenging air has also the additional function of removing the combustion products. Since, however, the scavenging air is not capable of cooling the cylinder and piston sufficiently to provide the necessary drop in temperature before the beginning of the next ignition cycle, all inlet openings for scavenging air and for cooling air are according to the invention either kept apart or, if designed as common openings, are of such generous dimensions that, in addition to the scavenging air required for removing combustion products, an excess of air is conveyed to the cylinder from the available air source (e. g. scavenging blower) after completion of the working stroke, said excess air cooling the entire cylinder interior to the temperature required for further operation.

According to the invention, cooling air may be drawn likewise from the scavenging blower in order to cool the non-working side of the piston crown and the interior of the piston. After this air has cooled the piston, it is allowed to escape, according to the invention, through the crank-case.

The arrangement according to the invention possesses the advantage that the problem of heat removal no longer affects the outer construction of the engine casing and particularly of the cylinders. The expense of providing liquid cooling jackets, air cooling fins, etc. is thus eliminated. Since the heat striking the inner wall of the cylinder at every piston stroke is removed, a cooling surface with constant heat transference qualities is available to meet all requirements; thus the risk of deterioration of heat transference due to dirt adhering to the cooling surface no longer exists. Moreover, the engine possesses all other advantages of an air-cooled engine, does not rely on the quality of any particular cooling liquid, and is highly resistant to freezing. As compared with the known air-cooled engines, moreover, the engine according to the invention has the additional advantage that the cooling air necessarily reaches the surfaces to be cooled always at the point at which the temperature of said surfaces is at its greatest, whilst in the case of the normal external air cooling, only one temperature point is available for heat reduction i. e. one corresponding approximately to the average value of heat losses occurring during the cycle. Since, in the engine to which the present invention relates, the cooling air is likewise drawn from the scavenging air blower, a particularly efficient blower is required which preferably assumes the form of a centrifugal blower fulfilling both functions. In addition, a centrifugal blower is considerably simpler and more reliable than the normal type of Roote's blower. The construction of an engine with centrifugal blower may be still further improved according to the invention by several special features which are explained in the following description to which the drawing refers.

In the drawing which illustrates one embodiment of the invention, by way of example a longitudinal section along the axis of rotation of the internal combustion engine is shown in diagrammatic form revealing further novel and progressive characteristics.

The crank case 1 carries the cylinders 2 in radial formation. Said cylinders 2 are provided in the normal manner with inlet slots 4 through which air enters the cylinder from the centrifugal blower 5 as the piston 6 exposes the slot 4. The essential difference as compared with known constructions is that the slots 4 and the centrifugal blower 5 are of extremely generous dimensions. The rotor of the centrifugal blower 5 is relatively large, whereby the channels 8 leading to slots 4 can be arranged in the cast body almost axially in close proximity to the perimeter of said rotor. The centrifugal blower 5 is provided with special auxiliary bores 9 through which solid impurities from the air are expelled at low pressure since the air at the tapping point 10 of the rotor 5 is moving approximately radially. Thereafter, the air is passed on through the high pressure point 11 of the rotor 5, firstly, in a radial direction, whereupon, on reaching the rim of the rotor it enters the channels 8 axially. In the diagram of this embodiment of the invention, a two-fold drive for the centrifugal blower is indicated; firstly, by gearing 12, 13 actuated directly by the crank shaft 14, and, secondly, by means of a motor 15 operating through a gear-, belt-, or chain-drive 16, 17. As a rule, only one of these drives is provided, but in certain circumstances, both may be fitted to the same engine. The drive incorporates a free-wheel device 18 and a mechanical or hydraulic coupling 19 actuating the rotor 5. The coupling 19 may be of the friction type.

The same air slots 4 through which the cylinder is inwardly cooled and exhausted are also employed to supply cooling air to the outer surface of the piston face 6.

According to a further progressive modification, special cooling chambers 24 for the cooling air, are arranged on the inside of each piston body. These possess outer openings 20 which coincide with the scavenging slots of the cylinder liner as the pistons move outwardly. The inner limit of these guide chambers 24 is formed by a cylindrical element 25 carrying the gudgeon pin 26. The cool air therefore enters the piston through the openings 20, thoroughly cools the interior and passes through the cylinders 25 into the crank case 1. The cross-section of the guide chambers 24 should preferably have restrictions 27 for the air current at the points on the piston 6 which require particularly thorough cooling.

Moreover, as may be seen from the drawing, the rotor of the centrifugal blower 5 is so large that it extends approximately as far as the inlet slots 4 in the cylinders 2. Thus, the cross-sections of the air current can be so enlarged at the wheel itself that the velocity of flow is considerably reduced, the desired conversion of velocity to pressure being sufficiently effected in the adjacent guide blade channels 11. Consequently, the spiral arrangement commonly used in other blowers may be dispensed with. The air is supplied directly from the rotor rim to the cylinder slots 4 through short guide blade channels 8 preferably integral with the cast engine body. Said guide blade channels are directed essentially in an axial direction only. In this way, practically the entire diameter of the housing is available for the rotor.

In the embodiment, air is extracted from the rotor of the blower 5 not only at the area of highest pressure i. e. the rim of the rotor, but also, approximately at the centre of the rotor, one or more radial tappings 9 being provided from which a part of the impelled air can escape. Said tappings 9 are intended to remove impurities in the air and are arranged almost radially in order to eject these heavier particles. The portion of air intended to reach the cylinders 2 is deflected once again to the rotor almost at right angles to the current of dispelled impurities and is further accelerated. When the blower 5 is driven directly by the engine by gear train 12, 13, it represents a considerable drag on the engine. The rigid connection between the engine and the blower 5 is interrupted, however, by a friction clutch 19 or hydraulic coupling and a free-wheel device or drive gear means 18 that may include an overrunning clutch, so that fluctuations in the performance of the engine cannot influence the blower. Moreover, in the case of motor vehicles, there is the advantage that, on changing to a higher gear in various stages, the blower 5 continues to rotate at the high rotary speed obtaining before the change, thus assisting the engine in reaching quickly full rotary power in the higher gear by supplying highly compressed air. If the rotor of the blower possesses a separate drive, for example an electric motor 15, said rotor can supply previously compressed warm air even before the engine has been started. By this means a special starting device for diesel engines is no longer necessary. In addition, a rotor independently operated whilst the engine is at rest may be employed in conjunction with a clutch arrangement, to set the engine in motion, whereby the normal starter becomes redundant.

The cooling air issuing chiefly from the crank case 1 after heating may be conveyed to a cooler device 21, the heat output 23 from which can be employed for internal heating of a motor vehicle. The air thus cooled may then be returned to the circulatory system of the engine, by an aperture 22 disposed at a tangent to the inlet port to the blower 5.

I claim:

1. In an internal combustion engine, a crank case having a combustion cylinder thereon, a hollow piston operable in said combustion cylinder, a supporting body having an inlet air passage for admitting air under pressure to the cylinder intermediate the height thereof and directly over the working surface of the piston when the piston is at the bottom dead center level in the cylinder, a centrifugal blower rotatable on said supporting body and delivering air to the air inlet passage, said piston having a side opening adapted to enter into registry with the inlet air passage on the return stroke of the piston to permit the scavenging air to pass through the piston, said piston being open at the bottom to direct air downwardly through the open end of the combustion cylinder and into the crank case at the end of the return stroke of the piston, said crank case having an air discharge opening, the air being delivered to the cylinder in greater quantities than needed for combusion and serving to scavenge the upper part of the combustion cylinder when the piston is in the base of the combustion cylinder, said combustion cylinder having an exhaust valve therein through which the scavenging air may pass when the piston is at the bottom of the stroke.

2. In an internal combustion engine as defined in claim 1, said hollow piston having a sleeve therein concentrically spaced relative to the internal wall of the cylinder, a piston rod extending through the bottom of the cylinder and into said sleeve, a gudgeon pin connecting said rod between the sides of said sleeve, a partition at the bottom of the piston closing off the space between the inner wall of the piston and the sleeve, the scavenging air when entering the piston passing outwardly away from the crank case along the internal wall of the piston and inwardly through the sleeve and open end of the cylinder out into the crank case.

3. In an internal combustion engine as defined in claim 2, and said hollow piston having restriction means in the space between the inner wall of the piston and sleeve to augment the cooling effect of the scavenging air.

4. In an internal combustion engine as defined in claim 1, said centrifugal blower having a rotor with passages extending radially to the air inlet passage, said supporting body having an opening leading outwardly from the rotor, said blower having a raised portion in each of the passages adjacent the entrance of the opening to deflect impurities in the air to the opening and to increase the velocity of the air passing outwardly along the radial passages of the rotor.

5. In an internal combustion engine as defined in claim 1, said crank case having a crank shaft and a piston rod connected between the piston and the crank shaft, and free wheeling driving gear means connected between the crank shaft and the blower to drive the blower and independent power means drivingly connected to said free wheeling driving gear means.

6. In an internal combustion engine as defined in claim 1, and conduit means having a cooling device and connected to the crank case to receive the heated air therefrom and to the supporting body for delivery of cooled air to the blower.

References Cited in the file of this patent

UNITED STATES PATENTS

| 1,688,076 | Grayson | Oct. 16, 1928 |
| 2,295,037 | Hedges | Sept. 8, 1942 |
| 2,341,549 | Helmick | Feb. 15, 1944 |

FOREIGN PATENTS

| 408,037 | France | Jan. 14, 1910 |